INVENTOR:
Siegfried Harcuba
By Werner W. Kleeman
His Attorney ns patented apr. 25, 1972

3,659,028
APPARATUS FOR THE CONTINUOUS PRODUCTION OF PROFILE GLASS AND PLATE GLASS IN BAND FORM
Siegfried Harcuba, Saint Gall, Switzerland, assignor to Interverre Etablissement, Vaduz, Liechtenstein
Filed Nov. 27, 1964, Ser. No. 414,200
Claims priority, application Switzerland, Dec. 4, 1963, 14,827/63
Int. Cl. C03b 5/32, 13/00
U.S. Cl. 65—185                                7 Claims

ABSTRACT OF THE DISCLOSURE

An apparatus for the continuous production of profile glass and plate glass in band form. A plurality of glass supporting and conveying rollers are provided over which a band of glass is advanced. A plurality of rotatable band contacting shaping tool means for shaping said band of glass are mounted so as to be movable in various positions both above and in contact with said band of glass. Adjusting means are provided for lowering and raising the plurality of shaping tool means towards and away from said band of glass and in a direction transverse to the direction of advancement of said band of glass during normal operation of the apparatus. Thus, profile glass and plate glass in band form can be produced in the same apparatus without necessitating stoppage of operation during a change-over.

---

The present invention has reference to an improved apparatus for the continuous production of profile glass and plate or flat glass in band form. Under the term "profile glass," as employed herein, there is to be understood a finite length of glass possessing a given profile or cross-sectional shape which is substantially constant throughout the length of the glass.

Methods and apparatuses have become known to the art according to which it is possible to continuously manufacture plate glass in various thicknesses, dimensions and surface patterns, with or without wire reinforcement. Other method techniques and apparatuses have become known to the art for the continuous production of structural or building glass. Such structural glass differs from the plate glass in profile or sectional shape, serving for the same or more uses. Of the mass produced structural glass profiles or shapes, particularly those have become known which preferably are characterized by a substantially U-type cross-section. In consequence of thier suitability as self-supporting plate glass structural elements they also render possible the formation of larger compound glass surfaces, without requiring crossbar separators or the like for preventing breakage due to wind pressure, snow loads and bending loads, such crossbar separators being necessary with plate glass panes.

Generally speaking, the present invention relates to a known kind of apparatus for the continuous production of profile glass and plate or flat glass in band form, which comprises a plurality of shaping tools rotatable about their own axes and a plurality of supporting and conveying rollers arranged behind one another in the direction of travel of the glass band. Now, the invention aims at improving an apparatus of this kind so that it is best suited to economically produce flat glass as well as profile glass in band form.

To achieve this objective several difficulties have to be overcome:

A first of these problems consists in rendering possible the transition of the production of one particular sort of profile glass to another sort, and also the transition of the production of profile glass to that of flat glass, or viceversa, without even a short interruption of the glass stream flowing out of the melting furnace, because such interruptions have many serious disadvantages. It is important that such interruptions can also be avoided if a changeover in the production conditions requires a replacement of one or more of the shaping tools. For achieving this, it is necessary that during such tool replacing operations flat glass can be produced instead of profile glass.

Furthermore, if somewhere in the glass stream there is a tendency to stow up in the vicinity of a shaping tool, it is important that this tool may quickly be removed from its working position to avoid such, since a stowing up of the glass stream, in most cases, causes very harmful inconveniences which may be very costly for many reasons.

Also, a further difficulty arises from the tendency of the glass band to deviate from its diretcion of drawing during forming for the production of structural glass profiles, for example during shaping to a substantially U-shaped type cross-section which requires an exact height of the edges of the glass band flexed through an angle of about 90°. This deviation causes such inaccuracies that such production must be considered as unusable and again melted down. During the required manipulations at or with the so-called glass-limiting boundary or border blocks arranged in front of the draw-in rollers, layer formations of the glass at the boundary block are loosened and, thus, additional disturbances are triggered in the glass flow. The known apparatuses do not permit any simple and positive removal of the faults which are brought about by the periodic recurring deviation of the glass stream.

With the aim of overcoming these difficulties, the present invention provides an improved apparatus of the aforementioned type which is generally characterized in that, in the range of the shaping tools there are, as components engaging the glass band from below, solely the supporting and conveying rollers which are all caliberless cylindrical and tangent at their upper side or surface to a common, at least approximately horizontal plane. Moreover, all of the shaping tools, at least with the major portion thereof, all bearing means of the shaping tools, as well as the devices or mechanisms, which also during the normal operation of the apparatus, allow for adjustment of the shaping tools transverse to the direction of travel of the glass band and also for raising and lowering the shaping tools away from and towards the glass band, respectively, are arranged above the aforesaid plane.

By virtue of such an arrangement the apparatus of the present invention is fundamentally distinguished over all those known apparatuses in which, the glass band is enclosed on all sides, in the manner of a caliber, at one or more shaping stations. In one apparatus of this known kind which has newly been proposed, shaping tools rotatable about their own axes and engaging the outer surface of a profile glass band which is being manufactured cooperate with shaping bodies secured to an endless belt or the like and engaging the inner surface of said profile glass band. In another apparatus of the prior art, attempts were made to configurate the inner surface of the profile glass band by more or less complicated combinations of rolls, or simply by a caliber roll having an axis of rotation parallel to that of a caliber roll engaging the outer surface.

All of these known apparatuses, including those which allow for adjustment of the distance between the axes of rotation of a pair of rolls for changing the thickness of a portion of the cross-section of the profile glass band, are by far not suited to overcome the difficulties which are experienced. A change of the profile configuration, if there is not taken into consideration that in one case the thickness is slightly changeable, is not possible without lengthy and costly alterations, therefore, also not without interruption of the glass stream with all its drawbacks. Also, such interruptions are inevitable if a stowing up of the glass stream occurs, and such stowing up is more likely to occur because there is no possibility to take into account the periodically occurring deviation of the glass stream from its direction of drawing or pulling.

Accordingly, a primary object of the present invention relates to an improved apparatus of the mentioned type for the continuous production of profile glass and plate glass in band form incorporating profile-imparting shaping or forming tools provided for operably engaging or acting upon the glass band emanating from the melting furnace, such apparatus overcoming all of the previously mentioned disadvantages associated with prior art devices of this type.

Another important object of the present invention is directed to the provision of an improved apparatus for the continuous production of profile glass and plate glass in band form, this apparatus being relatively simple in construction, highly reliable in operation, as well as economical to manufacture and operate.

A further important object of the present invention resides in the provision of an improved apparatus enabling the continuous production of both profile glass and plate glass at the same installation.

Still a further noteworthy object of this invention relates to the construction of an improved adjusting mechanism for the shaping or forming tools used during the production of profiled glass structures.

Other features, objects and advantages of the invention will become apparent by reference to the following detailed description and drawings in which.

Figure 1:
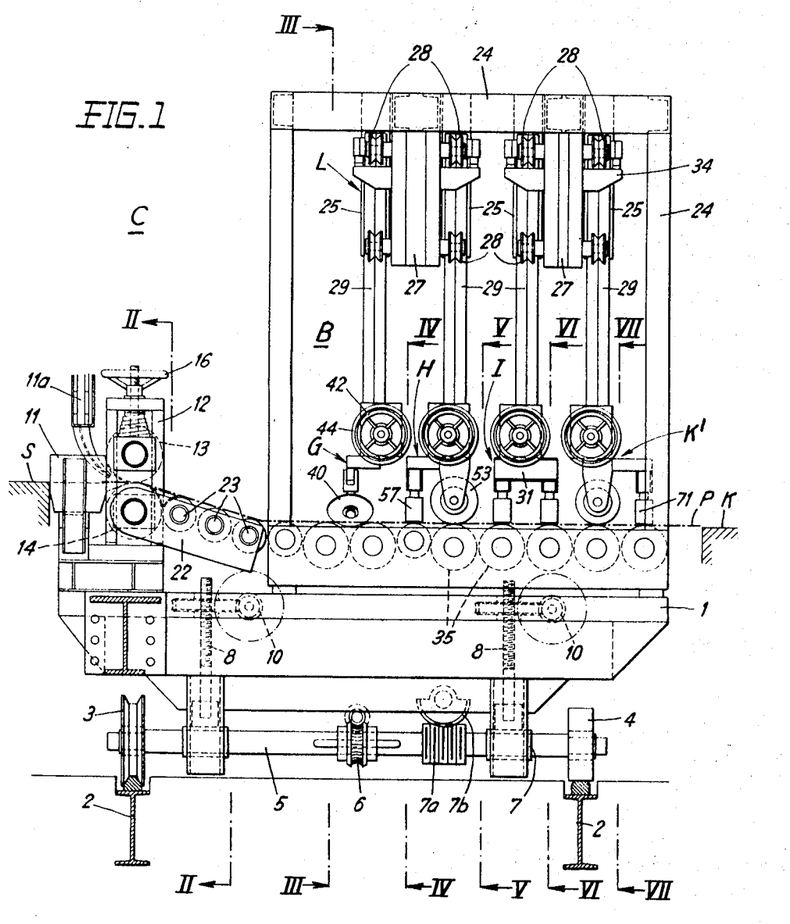
FIG. 1 illustrates a side view of the entire forming or shaping apparatus as such can be introduced or removed, respectively, from between the melting furnace and the annealing furnace or lehr.
Figure 2:
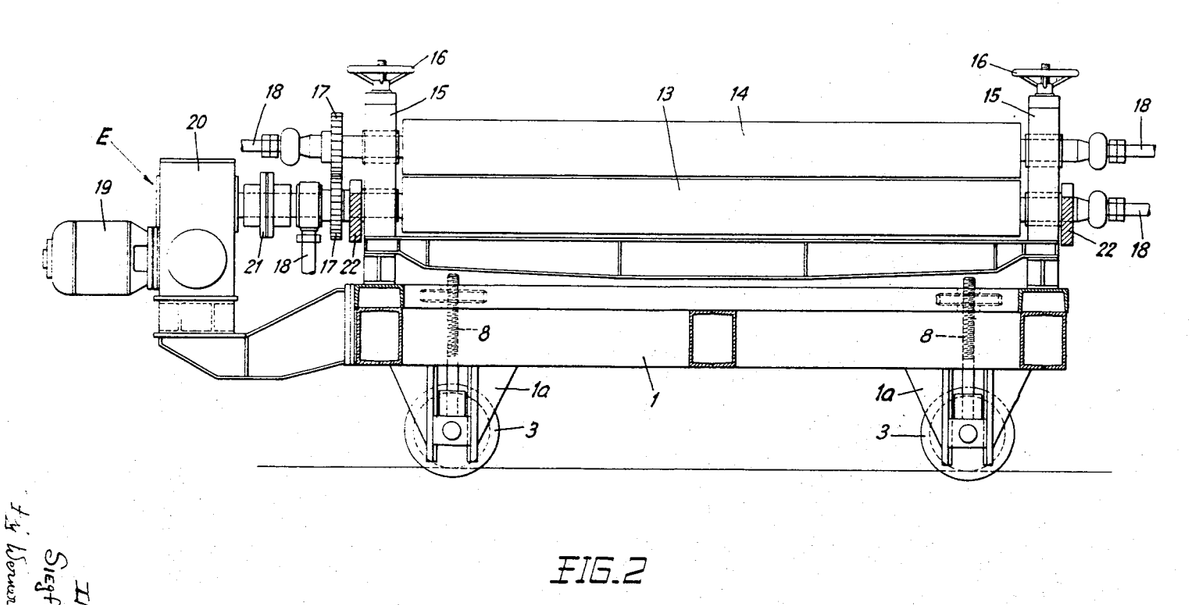
FIG. 2 is a cross-sectional view of the apparatus of FIG. 1, taken along the line II—II thereof, and depicting the draw-in roller unit and its drive.
Figure 3:
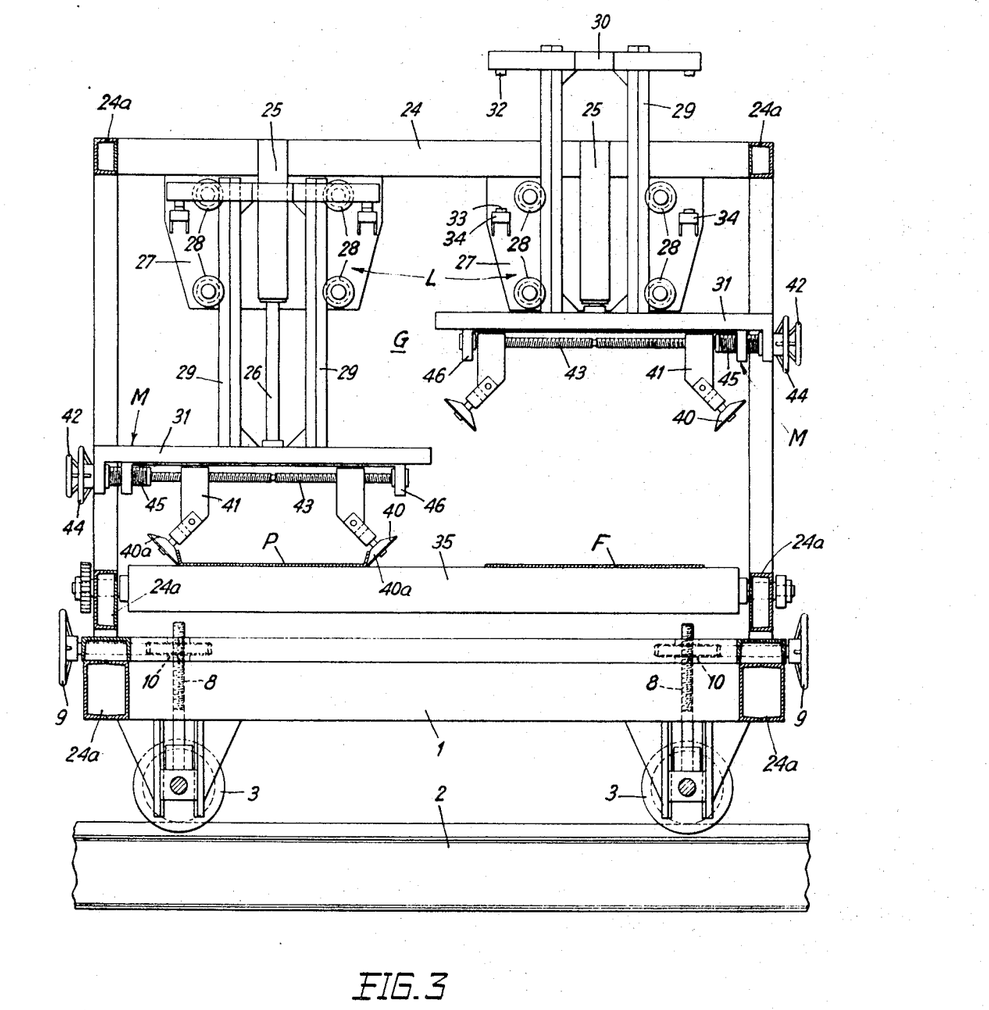
FIG. 3 is a cross-sectional view of the apparatus of FIG. 1, taken along the line III—III thereof, showing the preliminary forming or shaping station with two preliminary shaping or forming units in different positions.

Describing now the drawings, it will be understood that FIGS. 1 to 8 illustrate an embodiment of the inventive forming or shaping installation, generally designated by reference character C, for working two glass bands or webs P, F (FIG. 3) travelling in substantial parallelism with one another. FIG. 3 depicts such glass bands P, F in cross-section, and in FIGS. 4 to 7 there is illustrated only the right side of one-half of the length of specific stations of the aforesaid installation C.

Considering now specifically FIG. 1, it will be seen that this figure depicts an overall view of the new and improved forming or shaping installation C of the invention constructed to be movable between the outlet of a melting furnace S and the inlet of an annealing furnace or lehr K. This installation remains in this working position for both the production of plate or flat glass F and structural or building glass P possessing optional profiles or sectional shapes. It also remains in this position when performing the necessary exchange of the shaping or forming tools, later to be more fully considered. Generally speaking, this glass forming or shaping installation C comprises a draw-in or entry roller unit or assembly A provided with a transport or transfer roller bridge 22 as well as the shaping or forming section or unit B incorporating a frame 24 carrying the shaping or forming tools.

This assembly of components rests upon a carriage D including a lower chassis or underframe 1 provided with a wheel frame 1a which is capable of travelling upon tracks or rails 2 transverse to the general direction of travel of the glass. This wheel frame 1a is provided with two guide wheels 3 and two travelling wheels 4 seated in pairs upon an associated shaft 5. At least one of these shafts 5 is operably connected with a non-illustrated drive via a worm gear drive 6. The underframe 1 is mounted to be elevationally and lengthwise adjustably positionable upon the shafts 5 by means of slide ring means 7. More precisely, the lower chassis or underframe 1 can be adjusted in the direction of travel of the glass band or bands P, F for the purpose of more exact installation at the outlet of the melting furnace S and for removal therefrom respectively, by means of a segment 7b engaging with a cylindrical rack rail 7a rigidly seated upon and encircling the corresponding shaft 5. This segment 7b is operatively connected with the non-illustrated drive means via an appropriate speed reduction gear unit.

The underframe 1 can be elevationally adjusted in position at its rear as well as its front, as best shown in FIG. 1, and at its left-side as well as its right-side, as best shown in FIG. 3. For this purpose, the spindles 8 are employed, each of which can be rotated from the outside by means of a hand wheel 9 via a worm gear drive 10. This described leveling apparatus permits adjusting the height of the entire installation C, as well as for correlating such elevational position with respect to the outlet of the melting furnace S and also with regard to the inlet of the annealing furnace or lehr K. In so doing, it is thereby possible to also control the slope or drop of the glass flow, and this installation can also be considerably regulated in order to work with different types of melting furnaces and annealing furnaces.

Figure 9:
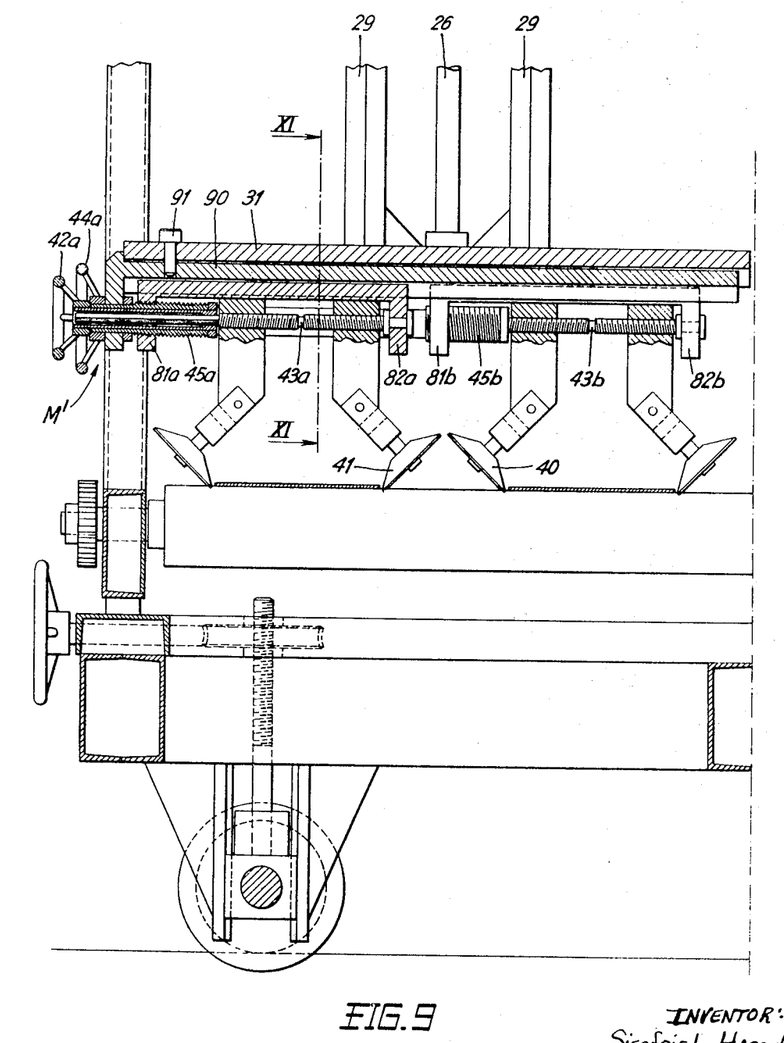
FIG. 9 is a fragmentary, vertical sectional view through a variant form of adjusting mechanism for the working tools.
Figure 10:
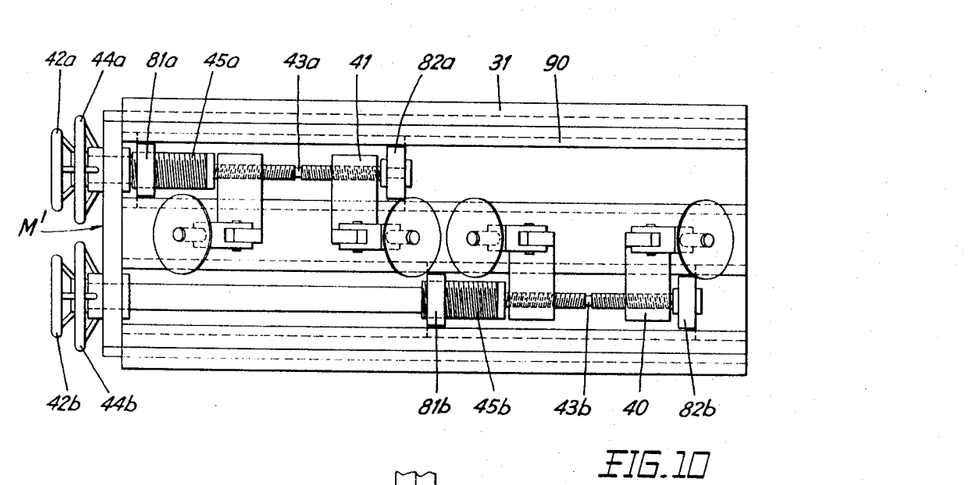
FIG. 10 is a bottom plan view of the device of FIG. 9, viewed from approximately the height of the plane of the glass band.
Figure 11:
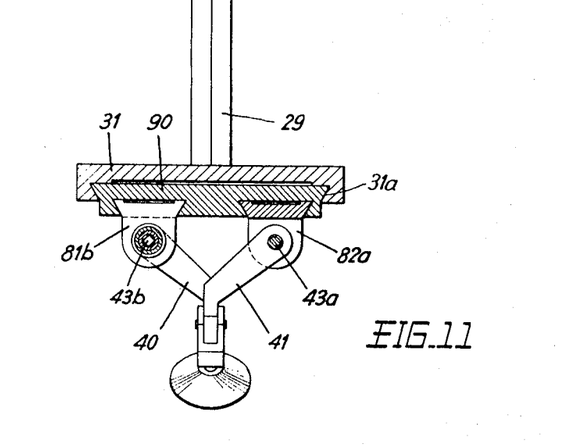
FIG. 11 is a cross-sectional view of the adjusting mechanism of FIG. 9, taken along the line XI—XI thereof.

The entry or draw-in apparatus A first of all embodies the support arrangement for the adjustable machine stone or block 11 which is preferably constructed to provide the glass stream into at least two branch streams and, if desired, also into four branch streams for instance, as required for the embodiment of FIGS. 9 to 11. Directly adjacent the machine block 11 there is arranged a reinforcement-delivery means 11a for the glass. Arranged in series after this reinforcement-delivery means 11a is the draw-in or entry roller mechanism 12, the details of which are separately illustrated in FIG. 2. This entry roller mechanism 12 comprises a lower non-displaceable draw-in roller 13 which is directly operatively connected with a drive arrangement E, to be considered shortly. This entry or draw-in roller 13 can advantageously be provided at its surface with a pattern embossment or the like. The upper draw-in roller 14 of the entry roller mechanism 12 is mounted in the rails 15 so as to be elevationally adjustable by means of the hand wheels 16. Furthermore, this upper draw-in roller 14 is rotatably connected through the agency of the gears 17 with the lower roller 13. These gears 17 possess exceptionally long teeth which also remain in engagement with one another when the upper draw-in roller 14 assumes its uppermost working position. Both of these draw-in rollers 13 and 14 are cooled by a suitable cooling medium, such as water for instance, to which end, in FIG. 2, the cooling water-connections 18 are visible. An electromotor 19 provided with a transmission 20 and a coupling 21 functions as the drive arrangement E for the aforesaid draw-in rollers 13 and 14.

The glass stream emanating from the melting furnace S arrives between the draw-in rollers 13, 14 via the machine block 11, in order to be pre-worked or rolled into a glass band or ribbon P or F, in known manner. This glass band P, F then enters the shaped or forming apparatus B by means of the transport roller bridge 22. The tools of the forming apparatus B are separately driven, as such will be more fully explained hereinafter. It is also to be understood that the transport roller bridge 22 is adjustable relative to the forming apparatus with regard to inclination or slope. To this end, the transport roller bridge 22 is mounted to be rockable about a transversely extending shaft 13a of the lower draw-in roller 13 in order to compensate for elevational differences, however, also to be able to conduct away the glass stream to a basement compartment or otherwise, if necessary, prior to reaching the actual forming apparatus B. The transport rollers 23 of the transport roller bridge 22 are operably coupled in suitable manner with the draw-in rollers 13, 14. Also, the side walls of the transport roller bridge 22 are hollow and water cooled in any convenient manner.

It will be recalled, the glass shaping or forming apparatus B incorporates a sturdy gantry frame 24 which is non-displaceably supported by the lower chassis or underframe 1 of the carriage D. This forming apparatus B embodies a preliminary shaping or forming station G (FIGS. 3 and 4), a so-called calibration or edge-forming station H (FIG. 5), a correction station I (FIG. 6), and a smoothing station K' (FIG. 7). According to an important aspect of the invention, the various forming tools of all four processing stations mentioned above can be raised from the associated glass band or ribbon P. F. For this purpose, in the illustrated embodiment, a fluid actuated lifting means, such as hydraulic or pneumatic lifting means L are provided, as best shown in FIGS. 1 and 3. The work tools of each two processing stations are operatively grouped or connected together, and possess for each half of the installation or machine C a common lifting mechanism L (FIG. 1). Now, each lifting mechanism L exhibits a lifting cylinder 25 connected to the gantry frame 24. A non-visible lifting piston together with its lifting piston rod or arm 26 reciprocably travels within this lifting cylinder 25. Additionally, guide blocks 27 are connected to the gantry frame 24. A number of idler guide rollers 28 are provided at the guide blocks 27, between which travel guide rails 29. Each two respective guide rails 29 are connected at the top with a common crossbar or yoke 30 and at the bottom with a common tool carrier or support 31. The crossbar 30 is provided at its underface with stop means 32 which, in the lowermost position of the tools, strike against counter stop means 33, the latter being rigidly seated upon stationary brackets 34.

Due to the crossbar 30 and the stop means 32 and 33, which can also be considered as abutments, there is not only guaranteed the correct elevational position of the shaping or forming tools, rather there is also ensured for the exactness of the lateral dimensions of the forming tools applied to the relevant glass band. If there appears the danger of obstruction of the glass, it is possible to simultaneously raise all tool carriers 31 for one-half of the installation by actuating a suitable valve arranged in a pressure conduit of the corresponding lifting mechanism L.

As clearly evident by inspecting FIGS. 1 to 3 all of the lifting cylinders 25 are of the same construction, yet for each two processing or work stations can be individually actuated. Moreover, it is also to be understood that all portions of the main frame components of the gantry frame 24 are tightly welded hollow members 24a which are water-cooled for instance, in the regions subjected to larger heat effects. The lifting cylinders 25 are also likewise suitably water-cooled.

It will further be understood that the support rollers 35 of the forming apparatus B are coupled by means of spur gears and are connected to the drive shaft of the mechanism of the annealing furnace. In the illustrated embodiment, this forming apparatus B possesses nine support rollers 35 which advantageously extend over the entire width of the installation or machine, whereas the superimposed shaping or forming tools, as will be recalled, are arranged in two substantially parallel groups, one to the left and the other to the right of the center line of the machine. Furthermore, such support rollers 35 are fixedly mounted in the frame 24.

Figure 4:
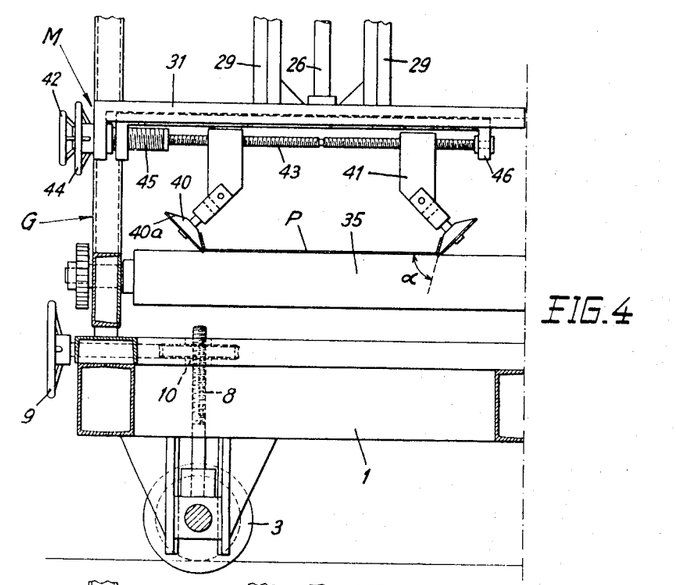
FIG. 4 is an enlarged fragmentary view of the arrangement shown in FIG. 3, taken along the line IV—IV of FIG. 1.

The processing or working station G depicted in FIGS. 3 and 4 serves to carry out the preliminary shaping or forming of the glass band P which later is to assume a substantially U-shaped cross-section for instance. The shaping or forming tools 40 of this processing station G are constructed as rotatable flat or truncated conical disks 40a. Moreover, these shaping or forming tools 40 are guided from above by means of carrier or bearing members 41 operatively connected with the lifting piston rod or arm 26, such support or bearing members 41 being adjustable with regard to the shaping angle $\alpha$.

By means of the adjusting mechanism M, more fully considered hereinafter, the preliminary shaping disks 40a can be gradually advanced towards the continuously moving glass band P by means of the hand wheel 42 via the threaded spindle 43. In so doing, the profile configuration (width, thickness, angle) can be optionally selected, and, in the case of the known deviation of the glass band P from the axis of its direction of drawing, the support 46 carrying the tools can likewise be laterally adjusted from the outside, by means of a hand wheel 44 via the hollow shaft or adjusting spindle shaft 45. The tool disks 40 which begin their forming or shaping operation in front of the associated support roller 35 beneath the cross section of the band are thus entrained by the traction of the wandering glass band P. As a result, the large frictional forces, as such occur by virtue of the drawing speed of the glass band with respect to rigid or driven tools, in this case is reduced to a minimum, thereby not impairing the quality of the glass. The removal and insertion of the forming elements occurs, according to the invention, after raising the tool carrier 31, without the glass flow having to be interrupted. The glass band P moves back onto the support rollers 35 after removing the tools, as best shown at the right-side of FIG. 3. The tools removed from the glass band P can now be exchanged or replaced by other tools—as will be further explained hereinafter—and thereafter again gradually applied to the glass band for imparting a new preliminary shaping.

Figure 5:
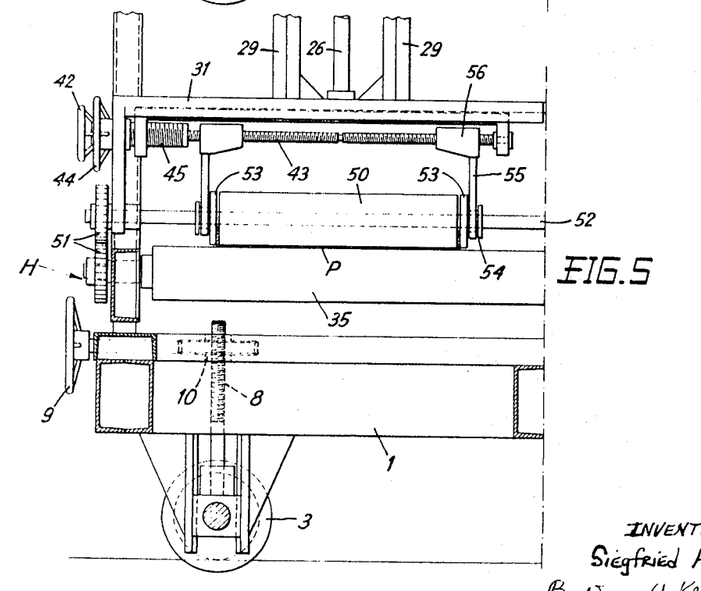
FIG. 5 is a cross-sectional view of the apparatus of FIG. 1, taken along the line V—V thereof, and showing details of the calibration or edge forming station.

The so-called calibration or end shaping station or apparatus H is depicted in FIG. 5. Such primarily embodies a known grooved roller 50 rigidly seated upon a shaft 52 driven via gear drive means 51. Furthermore, two adjusting or engaging plates 53 which are preferably freely rotatable, are axially displaceable upon the shaft 52. The adjusting plates or disks 53 are held at their hubs 54 by means of holding arms 55 which are mounted to respective positioning sleeves 56 and can be applied to and laterally withdrawn from the glass band P and the grooved roller 50 by means of a spindle drive 42, 43. Due to the adjusting or engaging disks 53 and the grooved roller 50 the final U-shaped form is imparted to the profile glass band P. In order to be able to achieve faultless shaping, infeed rollers 57 are connected in front of the grooved roller 50 (FIG. 1). These infeed rollers 57 are provided for forming the legs or webs of the U-shaped section of the band P and are arranged above a smaller support roller 35.

Figure 6:
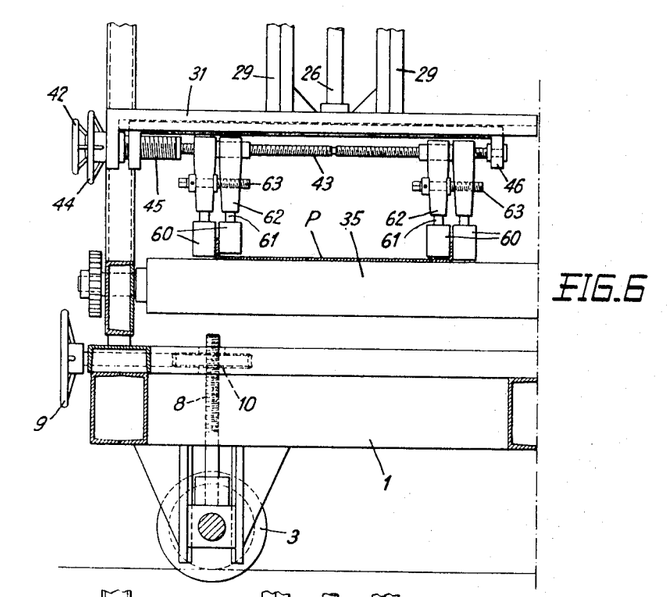
FIG. 6 is a cross-sectional view of the apparatus of FIG. 1, taken along the line VI—VI thereof, and showing details of the so-called correction station.
Figure 7:
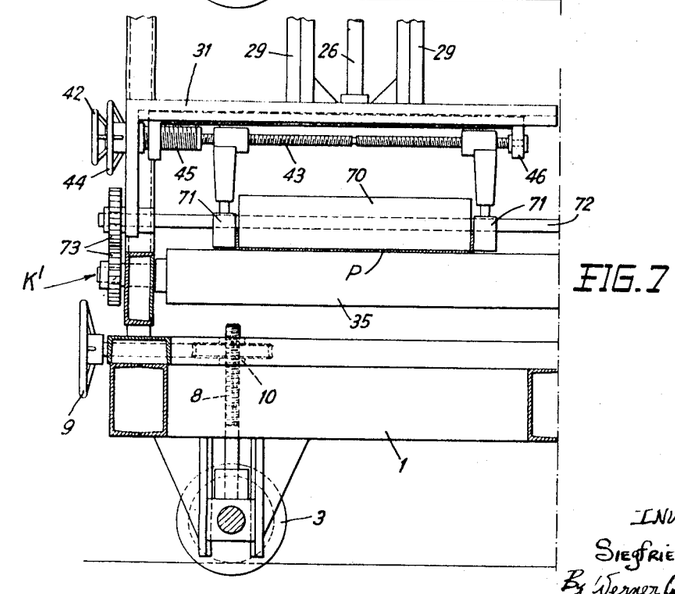
FIG. 7 is a cross-sectional view of the apparatus of FIG. 1, taken along the line VII—VII thereof, showing details of the smoothing rollers and their subsequently arranged correction rollers.

As best shown in FIG. 6, a correction station I is located after the calibration or edge forming apparatus H. This correction station I exhibits at each side two tandomly arranged pairs of correction rollers 60 which are mounted to be freely rotatable upon a respective shaft or rod 61. These rods 61 are rigidly seated in holders 62. Each two rods 61 can be regulated with respect to their mutual spacing by means of an adjusting spindle 63 which is adjustably displaceable by hand from externally of the machine. Consequently, the wall thickness of the margin or edge of the profile glass band can be changed. Here again, the correction tools 60–62 are seated upon a spindle drive, and can likewise be adjusted in their lateral position by the hand wheel 44.

According to FIG. 7, the therein illustrated smoothing station K' incorporates a smoothing roller 70 which is likewise driven. This smoothing roller 70 subsequently corrects possible curvatures of the profile and, at the same time, the successively arranged end or edge correction rollers 71 straighten the marginal or edge portions of the U-shaped profile or section. The smoothing roller 70 is seated upon a shaft 72 which is operatively connected with the driven support roller 35 via gear drive means 73. The end correction rollers 71 are adjustably mounted in the same manner as the outer correction rollers 60 previously considered. The finished shaped or profile glass band moves from the end correction rollers 71 out of the forming or shaping apparatus B into a conventional annealing furnace or lehr K.

As previously mentioned, the forming tools must be capable of adjustment in three different ways for the working stations depicted in FIGS. 3 to 7, namely:

(1) They must be capable of being raised in groups; for this purpose there is employed the previously described hydraulic lifting mechanism L of FIGS. 1 and 3;

(2) Each respective pair of tools must be capable of being displaced laterally as a unit in the machine in order to be able to follow lateral deviations of the glass band; and (3) Each two tools associated with one another must be capable of being adjusted towards one another and displaced away from one another.

Figure 8:
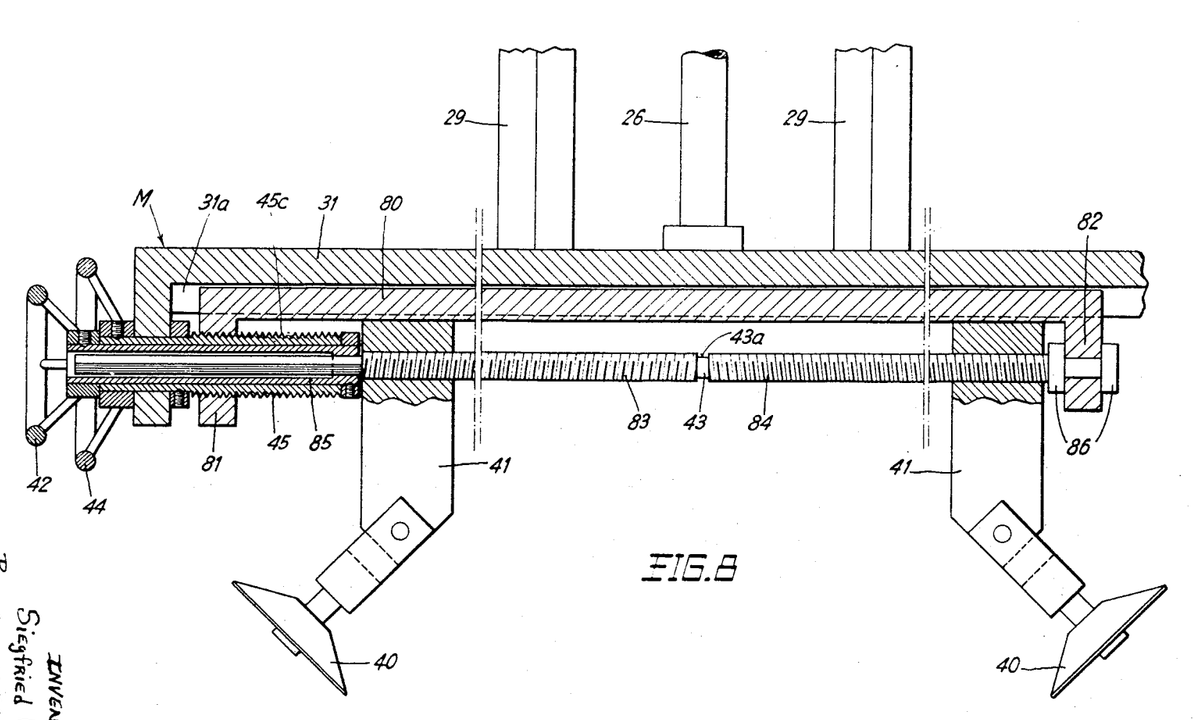
FIG. 8 is a vertical sectional view through an adjusting mechanism for the work tools, as such appears in the working stations depicted in FIGS. 3 to 7.

Both of the last-mentioned functions are carried out by means of the adjusting mechanism M depicted in detail in FIG. 8, and which is provided in essentially unchanged physical structure for all four working stations G, H, I and K' depicted in FIG. 1.

Now, it will be seen that the tool carrier 31 is suspended at the lifting arm or piston rod 26. A support member 80 is guided for transverse displacement in this tool carrier 31. A double spindle 43 is rotatably housed in the end flanges 81, 82 of the aforesaid support 80. This double spindle 43 possesses a left-hand and right-hand thread 83 and 84, respectively, which is divided at the middle 43c of the aforesaid spindle 43. Additionally, the spindle 43 is also directly operated from the outside by means of the hand wheel 42.

As clearly shown in FIG. 8, at the left side of the illustrated arrangement this spindle 43 can be elongated in telescopic manner in that, it piercingly extends into a sleeve 85 connected with the hand wheel 42 so as to be axially displaceable, yet non-rotatable. As a result, the entire spindle 43 can follow the lateral or sidewise displacement of the support 80 for the purpose of correcting for the directional deviations of the glass. The outer hand wheel 44 seated upon a hollow shaft 45 serves for laterally shifting the support 70. This hollow shaft 45 engages via its external threading 45c with the end flange 81 and directly displaces the latter when the hand wheel 44 is rotated. The end flange 82 is disposed between two collars 86 of the spindle 43 which serve as entrainment means. The tool holders 41 are seated by means of their internal threading upon the spindle 43 and, for example, carry the pivotable preliminary forming or shaping tool disks 40.

Thus, by rotating the hand wheel 44 the tool holders 41 are laterally displaced as a unit in the machine, in order to be able to follow the associated glass band. On the other hand, rotation of the hand wheel 42 enables the tools 40 to be adjusted so as to be gradually applied to the glass band or moved away from the latter, or for changing the overall width of the profile.

In accordance with a particularly advantageous variant embodiment of the forming or shaping apparatus B, it is possible to simultaneously work at each half of the length of the machine or installation C two glass bands, in other words, a total of four glass bands or ribbons. Accordingly, at each half of the machine C there are accommodated two complete groups of forming or shaping tools. In order to be able to adjustably position all of the tools from externally of the machine, the adjusting mechanism requires a particular physical construction, as such has been depicted in greater detail in FIGS. 9, 10 and 11.

Now, by referring to FIG. 10, it will be seen that for each tool group there are provided two partial spindles 43a, 43b arranged adjacent one another, that is, more specifically, behind one another in the direction of travel of the glass band (see, also FIG. 11). However, all of the tools 40 of these spindles 43a, 43b are disposed and can be adjusted in a common transverse plane. As best seen from FIG. 9, an adjusting mechanism M', generally of the type depicted in FIG. 8, is provided for each pair of tools 40. It is to be, therefore, understood that the same reference numerals are also here applied as in the embodiment of FIG. 8 for the same or analogous elements, yet in this case such reference numerals are also followed by a further reference character, such as the letters $a$ or $b$.

A still further advantageous physical construction of the inventive apparatus is depicted by this variant embodiment. More precisely, it will be recognized that the tool carrier or support 31 is provided with a dovetail guide 31a in which an intermediate support 90 is guided. This intermediate support 90 carries both adjusting mechanisms together with their tools as a unit.

The entire group of working tools of such a working or processing station, thus, at such time as these tools are raised out of engagement with the glass band, can be pulled sidewards at the support 90 out of the machine. After exchanging the tools or the entire support for one with new or different shaping components it can again be inserted in the guide 31a of the support 31. The support 90 is then locked in its working position by means of a resilient arresting or lock pin 91 (FIG. 9). After raising of a separating block or stone in front of the draw-in rollers 13, 14 it is possible, according to the invention, to form flat or plate glass during the aforedescribed exchange operation, whereby the edges of the glass profile or section themselves deposit upon the support rollers 35, as best shown at the right-hand portion of FIG. 3.

Accordingly, the illustrated embodiment permits the production of reinforced or non-reinforced plate glass F and profile or structural glass P, respectively, during continuous operation, whereby all changes during production as well as change-over to other structural or profile configurations can be undertaken without interrupting the flow of glass.

While there is shown and described present preferred embodiments of the invention it is to be distinctly understood that the invention is not limited thereto but may be oherwise variously embodied and practised with the scope of the following claims.

What is claimed is:

1. An apparatus for the continuous production of profile glass and plate glass in band form, said apparatus comprising:

a plurality of glass supporting and conveying rolle of cylindrical shape disposed adjacent one another, the upper surfaces of said plurality of rollers being disposed substantially tangentially to and defining a common, horizontal plane of delivery and formation;

means for advancing a band of glass upon the upper surfaces of said plurality of glass supporting and conveying rollers in a longitudinal direction in said horizontal plane;

a plurality of rotatable shaping tool means capable of contacting at least one lengthwise marginal portion of the glass band for shaping said band of glass;

mounting means disposed above said horizontal plane defined by said glass supporting and conveying rollers for supporting said plurality of shaping tool means only in various positions both above and substantially in said horizontal plane, said mounting means including first and second adjusting means for adjusting said various positions of said plurality of shaping tool means, said first adjusting means lowering and raising said plurality of said shaping tool means towards and away from said horizontal plane and into and wholly out of contact therewith, said second adjusting means adjusting the position of said plurality of shaping tool means in a direction transverse to said longitudinal direction of advancement of said band of glass;

the axial length of said glass supporting and conveying rollers being at least equal to the maximum possible effective transverse adjustment of said shaping tool means, whereby said glass supporting and conveying rollers only serve for supporting and conveying the glass in band form and do not perform any actual shaping operation upon the glass band.

2. An apparatus as defined in claim 1, further including a gantry frame unit and wherein said mounting means, said first and second adjusting means, and said plurality of glass supporting and conveying rollers are operatively attached to said frame unit.

3. An apparatus as defined in claim 2, wherein said mounting means comprises horizontally disposed tool carrier members, said second adjusting means being coupled with said horizontally disposed tool carrier members, tool bearing elements coupled with said shaping tool means, said tool bearing elements being attached to said second adjusting means, said first adjusting means comprising lifting means disposed above said tool carrier members and attached to said frame unit, guide means disposed between said tool carrier members and said frame unit, and a movable underframe attached to said frame unit.

4. An apparatus as defined in claim 3, wherein said second adjusting means comprises a support carried for transverse movement by each tool carrier member, an adjusting screw spindle means carried by said support, an adjustment spindle shaft for transversely displacing said support, at least one pair of said tool bearing elements and associated shaping tool means being slidably carried by each of said adjusting screw spindle means, said adjusting screw spindle means incorporating a double-spindle construction having oppositely threaded portions such that said shaping tool means associated with said tool bearing elements are displaceable towards and away from one another.

5. An apparatus as defined in claim 3, wherein said tool carrier members and associated shaping tool means are arranged in groups, one lifting means being provided for each group, and wherein guide means are disposed between each group of said tool carrier members and said frame unit.

6. An apparatus as defined in claim 4, wherein at least two supports are provided, each of said at least two supports being provided with a pair of rotatably mounted adjacently disposed double-spindle constructions, a pair of shaping tool means being displaceably carried at each double-spindle construction, whereby four glass bands can be simultaneously processed.

7. An apparatus as defined in claim 1, further including underframe means adjustable with respect to its total height, its lengthwise inclination as well as its transverse inclination, said underframe means being further displaceably mounted upon rail means for displacement transverse to said longitudinal direction of advancement of said band of glass.

References Cited

UNITED STATES PATENTS

| | | | |
|---|---|---|---|
| 3,077,755 | 2/1963 | Jamnik et al. | 65—253 |
| 2,308,985 | 1/1943 | Krieger | 226—199 X |
| 3,001,680 | 9/1961 | Nitkiewicz | 226—15 |
| 3,226,219 | 12/1965 | Jamnik | 65—185 X |
| 3,248,198 | 4/1966 | Jamnik et al. | 65—253 X |

FRANK W. MIGA, Primary Examiner

U.S. Cl. X.R.

65—94, 111, 254; 226—88, 199